July 24, 1928.
C. L. FORTIER
1,678,213
TEMPERATURE REGULATION
Filed Dec. 27, 1926     2 Sheets-Sheet 1
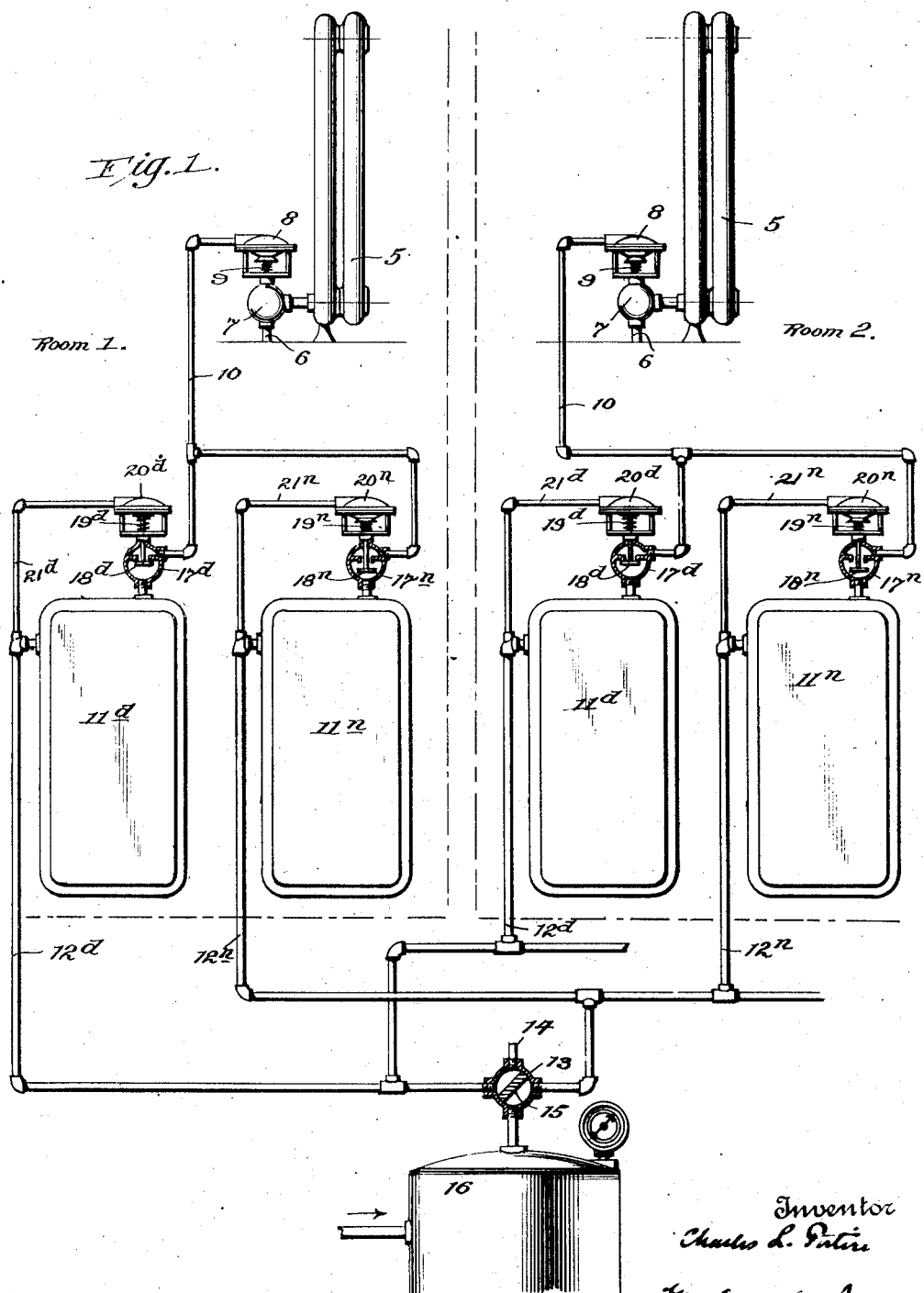

July 24, 1928.
C. L. FORTIER
1,678,213
TEMPERATURE REGULATION
Filed Dec. 27, 1926
2 Sheets-Sheet 2
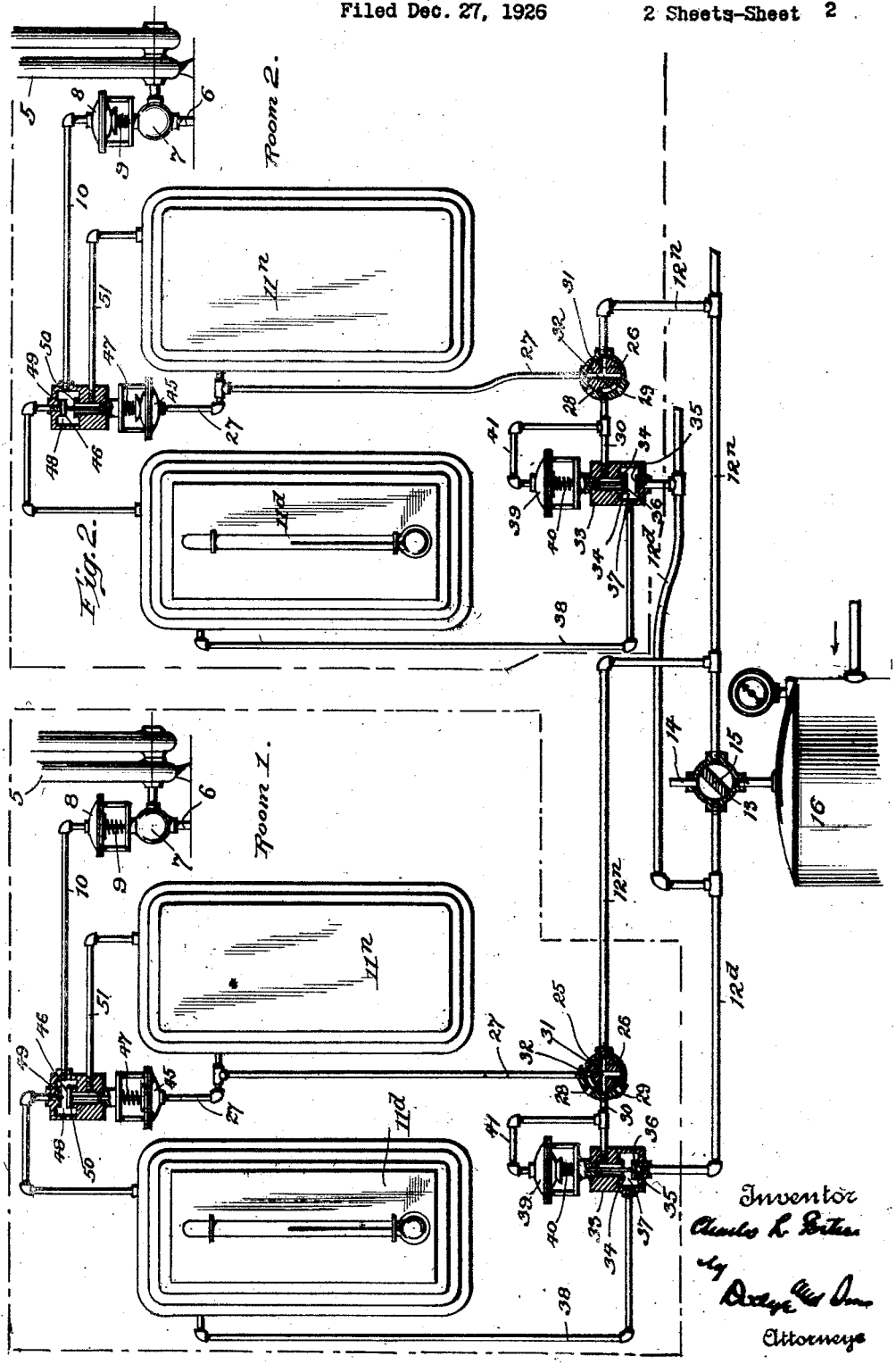

Patented July 24, 1928.

1,678,213

UNITED STATES PATENT OFFICE.

CHARLES LYMAN FORTIER, OF MILWAUKEE, WISCONSIN, ASSIGNOR TO JOHNSON SERVICE COMPANY, OF MILWAUKEE, WISCONSIN, A CORPORATION OF WISCONSIN.

TEMPERATURE REGULATION.

Application filed December 27, 1926. Serial No. 157,345.

This invention relates to temperature regulation, and particularly to systems intended for use in large buildings, such as factories, school-houses and office buildings, and arranged to maintain one temperature during the day and another temperature during the night, the temperature in each room being controlled by a thermostat local to that particular room.

In its simplest form the invention contemplates the use of two pneumatic thermostats in each room, one set to maintain one temperature, for convenience called day temperature, and the other set to maintain a lower temperature, for convenience called night temperature. The day thermostats are supplied by one supply line, and the night thermostats are supplied by another supply line, and a master valve, under the control of the engineer, is arranged to supply pressure to one supply line and simultaneously vent the other supply line. The effect is to render one thermostat operative and the other inoperative. Both thermostats are connected to operate a single heat control means such as a valve mechanism controlling one or more radiators in the room, and a switching valve mechanism is included which is responsive to pressure conditions in one or both of the supply lines, and which functions to connect the active thermostat in controlling relation with the heat controlling means to the exclusion of the inactive thermostat.

A system of the simple type just outlined is sufficient for buildings which are occupied as an entirety or vacant as an entirety, and it will be understood that the night thermostat may be set to respond at such a low temperature that the effect of placing the night thermostat in control is virtually to shut off the supply of heat.

There is, however, a type of buildings, notably school buildings and office buildings, in which one or more rooms may be occupied at night, a condition requiring some provision for the heating of such rooms to normal day temperatures at such time, while the remaining rooms in the building remain at night temperature. To meet this condition I have further developed the structure by the inclusion of a diverting valve or controller local to each room and capable of a setting in which the day thermostat is rendered operative to control the heating means.

Generally stated, this arrangement contemplates the temporary connection of the day thermostat to the night supply line, the arrangement being such that when the thermostat is so connected it is connected to actuate the heat controlling means to the exclusion of the night thermostat.

In the accompanying drawings, I illustrate in diagram two arrangements, respectively meeting the requirements of the two operative conditions above outlined. The drawings are diagrammatic, and no effort has been made to preserve the scale of the various parts as these parts are susceptible of wide variations and follow standard practice in the art.

In the drawings:

Fig. 1 is a diagrammatic layout of a system for controlling the day and night temperatures in large buildings where no provision is made for maintaining the day temperature in any room while the night temperature is effective.

Fig. 2 is a similar diagram of a system having means for permitting the maintenance of the day temperature in any room while the system as a whole is set to maintain night temperature.

In each view control equipment for two rooms is shown, but it will be understood that any number of units for controlling additional rooms may be connected in a similar manner. The equipment for each individual room is enclosed in dotted lines, and the rooms are differentiated by the legends "Room 1" and "Room 2".

An ordinary steam radiator is indicated at 5 and is intended as typical of any regulable local heating means. Steam for the radiator is supplied through a connection 6 under the control of the diaphragm operated valve 7 of ordinary type. This includes a diaphragm motor 8 and a spring 9 which tends to open the valve. The parts are so arranged that when pressure is admitted to the diaphragm motor 8 the spring 9 is overpowered and the valve 7 is closed. Conversely, when the diaphragm motor 8 is vented the spring 9 opens the valve 7.

Motive pressure fluid is supplied to the diaphragm motor 8 through a pipe connection 10 and the supply of motive fluid to this pipe is under the alternate control of two thermostats, $11^d$, which is the day thermostat, and $11^n$, which is the night thermostat.

These thermostats are preferably of identical construction, but the exact construction of the thermostat is immaterial so long as it be of a type (many of which are known) in which the thermally responsive element acts directly, or through a relay, to admit pressure fluid to the pressure motor 8 or release it therefrom.

The necessary pressure fluid is supplied to the thermostat $11^d$ by a supply line $12^d$ and to the thermostat $11^n$ by a supply line $12^n$. The supply lines $12^d$ and $12^n$ are connected with the master valve 13 which includes a vent port 14 and a rotary plug 15. The valve 13 and plug 15 are so designed that in one position of the plug 15 one of the lines $12^d$ or $12^n$, as the case may be, is connected with supply reservoir 16 and the other with the vent 14.

In order to prevent interference by the inert one of the two thermostats $11^d$ or $11^n$ with the action of the other, a switching valve mechanism is provided, which in this case consists of two diaphragm valves, one of which, $17^d$, is interposed between thermostat $11^d$ and the pipe 10, and the other of which, $17^n$, is interposed between the thermostat $11^n$ and the pipe 10. Considering first the valve $17^d$, it includes a valve member $18^d$ which is urged seated by a spring $19^d$ and which may be forced open by pressure fluid acting on a diaphragm motor $20^d$. Pressure to actuate the motor $20^d$ is conducted from the pipe $12^d$ by a branch connection $21^d$. The various parts of the valve $17^n$ are similar in construction and similarly numbered but with the distinguishing subscript "n".

It follows from the above that when the pipe $12^n$ is subject to pressure, the pipe $12^d$ is vented. Consequently, the thermostat $11^n$ is rendered active and the valve $17^n$ is opened to permit the thermostat $11^n$ to control the diaphragm motor 8 at the same time the thermostat $11^d$ is rendered inactive and the valve $17^d$ is caused to close so that the thermostat $11^d$ may exert no interfering effect on the diaphragm motor 8.

As suggested, various changes may be made in the specific construction of the thermostats $11^d$ and $11^n$. While most thermostats operate to close the heat regulating valve 7 by admitting pressure to the diaphragm motor 8, thermostats are known which operate in the reverse sense, and, obviously, to avail of such a thermostat it would be necessary to reverse the action of the motor 8 and spring 9 so that the spring urges the valve closed and the motor acts in opposition to force it open. Both types of thermostat and both types of heat control valve being known, it is deemed unnecessary to illustrate the possible reversed arrangement which will be obvious to any one skilled in the art. So far as the present invention is concerned it is immaterial which is used, so long as those which are used are properly coordinated.

Referring now to Fig. 2, it will be observed that the parts 5, 6, 7, 8, 9, 10, $11^d$, $11^n$, $12^d$, $12^n$, 13, 14, 15 and 16, are essentially the same as correspondingly numbered parts in Fig. 1. The parts 17, 18, 19, 20 and 21, with the respective subscripts "d" and "n" are omitted, and a single valve mechanism, capable of performing the same function, is substituted. Furthermore, the supply lines $12^d$ and $12^n$ are not connected directly with the thermostats $11^d$ and $11^n$, but are connected through a diverting valve mechanism which may be set in two different positions.

In the normal position the pipe $12^d$ is in communication with the thermostat $11^d$ and the pipe $12^n$ is in communication with the thermostat $11^n$. In the abnormal position designed to permit day temperature to be maintained in a room while the system is set to maintain night temperature, the thermostat $11^n$ is cut off from the pipe $12^n$ and vented to atmosphere, and an automatic valve mechanism functions to connect whichever one of the pipes $12^d$ or $12^n$ is under pressure, with the thermostat $11^d$.

This diverting valve mechanism includes a body 25 having a plug cock 26 rotatable therein. Pipe $12^n$ communicates with one port of this cock and the pipe 27 communicates with another port and leads to the supply connection of the thermostat $11^n$. There are two atmospheric vent ports in the body 25, indicated at 28 and 29. There is a diverting connection 30 also leading to a port in the body 25. The plug 26 is provided with a T-shaped port 31 and with a recess 32. The parts are so arranged that in normal position (see Room 2) pipe 30 is connected to vent 29 by recess 32. In the abnormal position (see Room 1) pipe $12^n$ is connected to pipe 30 by port 31, and pipe 27 is connected to atmospheric vent 28 by recess 32.

The pipe 30 is connected directly to a valve 33 having two opposed seats 34, 35, against which a valve member 36 alternately seats, these seats being formed in a chamber 37. The pipe 30 is connected to a passage leading to the upper seat 34. The pipe $12^d$ is connected to a passage leading to the lower seat 35, and the chamber 37 is connected by a pipe 38 with the supply connection of the thermostat $11^d$. The valve 36 is operated in reverse directions by a diaphragm pressure motor 39 and an opposing spring 40, and actuating pressure is conveyed to the diaphragm motor 39 by way of pipe 41 which is branched off from diverting connection 30. When the cock 26 is in normal position (see Room 2) pipe 30 is vented to atmosphere and spring 40 moves valve 36 upward until it seats at 34. This connects pipe 38 with pipe 12$^d$. Thus in normal condition (see Room 2) thermostat 11$^n$ is always connected to pipe 12$^n$ and thermostat 11$^d$ is always connected to pipe 12$^d$. In the abnormal condition (see Room 1) pipe 27 is disconnected from pipe 12$^n$ and vented to atmosphere.

Remembering that pipe 12$^n$ is vented by the master valve when pipe 12$^d$ is under pressure, and vice versa, and that the position of valve 36 is controlled by the pressure condition in pipe 12$^n$, it will be observed that whichever one of the pipes 12$^d$ or 12$^n$ is under pressure will be connected to the pipe 38 and hence in supplying relation with the day thermostat 11$^d$. This last statement applies only when plug 36 is in the abnormal position shown in Room 1.

Since only one of the two thermostats can be active at a time, it is possible to provide means to connect these thermostats selectively with the motor 8 by a device responsive to the supply pressure condition for one thermostat, instead of using two separate valves, as is done in Fig. 1. This possibility is illustrated in Fig. 2.

45 is a pressure motor subject to the pressure in pipe 27, and acts in an upward direction on a valve 46 against the resistance of a spring 47. The valve 46 moves within a chamber 48 between an upper seat 49 and a lower seat 50. The pipe 10 is connected to the chamber 48. The controlling pressure line 51 of the thermostat 11$^n$ is connected to the port in seat 50 and the control pressure line 52 of the thermostat 11$^d$ is connected to the port in seat 49.

Thus when pipe 27 is under pressure, motor 45 moves valve 46 to seal against the upper seat 49, disconnecting thermostat 11$^d$ from the motor 8 and connecting the thermostat 11$^n$ therewith. Conversely, when pressure is vented from the pipe 27, spring 47 moves the valve 46 downward to seal against the seat 50, connecting thermostat 11$^d$ with motor 8 and disconnecting thermostat 11$^n$ therefrom.

If all the cock plugs 26 are set in normal position, i. e., the position shown in Room 2, the system illustrated in Fig. 2 will function in substantially the same manner as the system described in Fig. 1, that is, it will maintain day temperature in all rooms when line 12$^d$ is under pressure and line 12$^n$ is vented, and night temperature in all the rooms when line 12$^n$ is under pressure and line 12$^d$ is vented. However, if any plug cock 26 be shifted to abnormal position, as is illustrated in connection with Room 1, Fig. 2, the temperature of the corresponding room will be maintained at the day setting by the thermostat 11$^d$, and this action will occur regardless of the setting of the control valve 15.

The same latitude in the selection of thermostats, heat controlling valves, and the like, as has been suggested with reference to Fig. 1, is possible in the structure of Fig. 2. The invention resides, not in the adoption of any particular type of pneumatic thermostat, but in the provision of a duplex thermostat system with individual supply lines, both systems controlling the same heating means, and such control being selective.

What is claimed is,—

1. The combination of pressure actuated heat controlling means; a plurality of fluid pressure controlling thermostats adapted in alternation one with another to control the supply of motive fluid to said means; individual pressure fluid supply lines connected with corresponding ones of said thermostats; and adjustable means for supplying pressure fluid to said lines selectively.

2. The combination of pressure actuated heat controlling means; a plurality of fluid pressure controlling thermostats; individual pressure fluid supply lines connected with corresponding ones of said thermostats; adjustable means for supplying pressure fluid to said lines selectively; and means responsive to fluid pressure for connecting said thermostats selectively in controlling relation with said pressure actuated means.

3. The combination of pressure actuated heat controlling means; a plurality of fluid pressure controlling thermostats; individual pressure fluid supply lines connected with corresponding ones of said thermostats; adjustable means for supplying pressure fluid to said lines selectively; and means responsive to the pressure in one of said supply lines for connecting said thermostats selectively in controlling relation with said pressure actuated means.

4. The combination of pressure actuated heat controlling means; a pair of fluid pressure controlling thermostats connected to control the pressure in said pressure actuated means, said thermostats each being rendered operative by the supply of motive fluid thereto; a pair of motive fluid supply lines, each one corresponding to a particular one of said thermostats; adjustable means for supplying motive fluid to said lines selectively; and a diverting device adjustable to two positions, in one of which it connects respective thermostats to corresponding lines, and in the other of which it disconnects one thermostat from its line and establishes a feeding connection by which either line may supply the other thermostat with motive fluid.

5. The combination of pressure actuated heat controlling means; a pair of fluid pressure controlling thermostats connected to control the pressure in said pressure actuated device, said thermostats each being rendered operative by the supply of motive fluid thereto; a pair of motive fluid supply lines each one corresponding to a particular one of said thermostats; adjustable means for supplying motive fluid to said lines selectively; and a diverting device including a manually operable valve and a pressure actuated valve so arranged that in one position of the manually operated valve each thermostat is connected to the corresponding supply line, and in the other position of the valve one thermostat is disconnected and the pressure actuated valve functions in response to supply pressure to connect the other thermostat with whichever line is supplied with motive fluid.

6. The combination of pressure actuated heat controlling means; a pair of fluid pressure controlling thermostats adapted in alternation with each other to control the fluid pressure in said pressure actuated means; a pair of individual pressure fluid supply lines each normally connected with a corresponding one of said thermostats; adjustable means for supplying pressure fluid to said lines selectively; normally inactive motor actuated valve means for connecting one of said thermostats automatically to whichever of said supply lines is supplied with pressure fluid; and manually operable means for disconnecting the other of said thermostats from its supply line, and substantially simultaneously rendering said normally inactive means active.

7. The combination of pressure actuated heat controlling means; a pair of fluid pressure controlling thermostats adapted in alternation with each other to control the fluid pressure in said pressure actuated means; a pair of individual pressure fluid supply lines each normally connected with a corresponding one of said thermostats; adjustable means for supplying pressure fluid to said lines selectively; normally inactive motor actuated valve means for connecting one of said thermostats automatically to whichever of said supply lines is supplied with pressure fluid; and manually operable means for disconnecting the other of said thermostats from its supply line, venting said other thermostat, and substantially simultaneously rendering said normally inactive means active.

8. The combination of pressure actuated heat controlling means; a pair of fluid pressure controlling thermostats; individual pressure fluid supply lines normally connected with corresponding ones of said thermostats; adjustable means for supplying pressure fluid to said lines selectively; means responsive to the supply pressure at one of said thermostats for connecting said thermostats selectively in controlling relation with said pressure actuated controlling means; a manually operable valve controlling the supply to the last named thermostat, and adjustable to a position in which it connects its supply line to a diverting connection; a valve controlling the supply of pressure fluid to the other thermostat and serving in normal position to connect said thermostat with its supply line and in abnormal position interrupting such connection and establishing connection with said diverting connection; means for urging said valve to its normal position; a motor for shifting said valve to abnormal position; and a connection from said diverting connection to said last named motor.

9. The combination of pressure actuated heat controlling means; a pair of fluid pressure controlling thermostats; individual pressure fluid supply lines normally connected with corresponding ones of said thermostats; adjustable means for supplying pressure fluid to said lines selectively; means responsive to the supply pressure at one of said thermostats for connecting said thermostats selectively in controlling relation with said pressure actuated controlling means; a manually operable valve controlling the supply to the last named thermostat, and adjustable to a position in which it vents said thermostat and connects its supply line to a diverting connection; a valve controlling the supply of pressure fluid to the other thermostat and serving in normal position to connect said thermostat with its supply line and in abnormal position interrupting such connection and establishing connection with said diverting connection; means for urging said valve to its normal position; a motor for shifting said valve to abnormal position; and a connection from said diverting connection to said last named motor.

10. The combination of two sets of pneumatic thermostats of a type activated by the supply of pressure fluid thereto; a plurality of pressure actuated heat regulating means each connected to be controlled by one thermostat of each set; two pressure fluid supply lines each connected with all the thermostats of a corresponding set; and means for supplying motive air to said lines selectively.

11. The combination of two sets of pneumatic thermostats of a type activated by the supply of pressure fluid thereto; a plurality of pressure actuated heat regulating means each connected to be controlled by one thermostat of each set; two pressure fluid supply lines each connected with all the thermostats of a corresponding set; means for supplying motive air to said lines selectively; and means operable to disconnect a thermostat of one set from its line and connect the corresponding thermostat of the other set with the line of the first set.

12. The combination of two sets of pneumatic thermostats of a type activated by the supply of pressure fluid thereto; a plurality of pressure actuated heat regulating means; connections between each of said means and one thermostat of each set; means for controlling said connections; two pressure fluid supply lines each connected with all the thermostats of a corresponding set; means for supplying motive air to said lines selectively; and means controlled by said selective supply and serving to actuate said connection controlling means to connect said regulating means selectively to the active set of thermostats.

In testimony whereof I have signed my name to this specification.

CHARLES LYMAN FORTIER.